United States Patent
Surprise et al.

(10) Patent No.: US 12,367,331 B2
(45) Date of Patent: Jul. 22, 2025

(54) APPROACH TO CHILD BLOCK PINNING

(71) Applicant: International Business Machines Corporation, Armonk, NY (US)

(72) Inventors: Jesse Peter Surprise, Highland, NY (US); Eduard Herkel, New York, NY (US); Ofer Geva, Poughkeepsie, NY (US); Faisal Hasan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 17/671,696

(22) Filed: Feb. 15, 2022

(65) Prior Publication Data
US 2023/0259684 A1  Aug. 17, 2023

(51) Int. Cl.
*G06F 30/392* (2020.01)
*G06F 30/327* (2020.01)
(Continued)

(52) U.S. Cl.
CPC .......... *G06F 30/392* (2020.01); *G06F 30/327* (2020.01); *G06F 30/3947* (2020.01); *G06F 30/3953* (2020.01)

(58) Field of Classification Search
CPC .. G06F 30/392; G06F 30/327; G06F 30/3953; G06F 30/3947
(Continued)

(56) References Cited

U.S. PATENT DOCUMENTS

| | | | |
|---|---|---|---|
| 6,374,394 B1 * | 4/2002 | Camporese | G06F 30/392 716/132 |
| 6,415,428 B1 * | 7/2002 | Camporese | G06F 30/392 716/134 |

(Continued)

FOREIGN PATENT DOCUMENTS

| | | | | |
|---|---|---|---|---|
| CN | 112989749 A | * | 6/2021 | G06F 30/394 |
| JP | H1021280 A | * | 1/1998 | |

(Continued)

OTHER PUBLICATIONS

Disclosed Anonymously,"Logic and Unit Floor-plan aware pin placement," An IP.com Prior Art Database Technical Disclosure, IP.com No. IPCOM000221046D, Aug. 24, 2012 (11 pages).

*Primary Examiner* — Phallaka Kik
(74) *Attorney, Agent, or Firm* — CANTOR COLBURN LLP; Randy Emilio Tejeda

(57) ABSTRACT

A hybrid block pinning optimization system includes a small-block processing module that processes a parent-level hierarchy including a plurality of child-level blocks and places a plurality of initial child-block pins corresponding to the child-level blocks. A child processing module places a logic element at a location within a given child block based on the placement of the initial child pins, discards the plurality of initial child pins while maintaining the location of the logic element, places at least one optimized child pin based at least in part on the location of the at least one logic element, and performs an abstraction operation on the logic element while maintaining the at least one child pin within (Continued)

the child blocks. A hierarchical large block synthesis (hLBS) processing module performs an hLBS operation to dissolve the plurality of child blocks, while maintaining the at least one optimized child pin.

20 Claims, 14 Drawing Sheets

(51) Int. Cl.
  *G06F 30/3947* (2020.01)
  *G06F 30/3953* (2020.01)
(58) Field of Classification Search
  USPC .................. 716/104, 122, 129, 130; 703/14
  See application file for complete search history.

(56) References Cited

U.S. PATENT DOCUMENTS

| | | | |
|---|---|---|---|
| 6,460,169 B1 | 10/2002 | Camporese et al. | |
| 6,662,349 B2* | 12/2003 | Morgan | G06F 30/39 |
| | | | 716/122 |
| 7,971,174 B1* | 6/2011 | Khalsa | G06F 30/394 |
| | | | 716/129 |
| 9,418,107 B2* | 8/2016 | Johnson | G06F 16/2454 |
| 9,536,030 B2 | 1/2017 | Fricke et al. | |
| 9,910,952 B2 | 3/2018 | Affeldt et al. | |
| 10,157,255 B2* | 12/2018 | Affeldt | G06F 30/394 |
| 10,885,249 B1* | 1/2021 | Kollesar | G06F 30/392 |
| 10,902,175 B1* | 1/2021 | Surprise | G06F 30/394 |
| 11,080,456 B2 | 8/2021 | Kazda et al. | |
| 2005/0076319 A1* | 4/2005 | Chow | G06F 30/392 |
| | | | 716/122 |
| 2005/0081173 A1 | 4/2005 | Peyran | |
| 2008/0066039 A1* | 3/2008 | Berry | G06F 30/30 |
| | | | 257/773 |
| 2017/0249413 A1* | 8/2017 | McComber | G06F 30/394 |
| 2018/0004862 A1* | 1/2018 | Craciun | G06F 30/392 |

FOREIGN PATENT DOCUMENTS

| | | | | |
|---|---|---|---|---|
| WO | | 02101601 A2 | 12/2002 | |
| WO | WO-2017151332 A1 | * | 9/2017 | ......... G06F 17/5077 |

* cited by examiner

APPROACH TO CHILD BLOCK PINNING

BACKGROUND

The present disclosure generally relates to the fabrication and design of semiconductor chips and integrated circuits, and more particularly to the physical layout and placement of logic cell pin placements in an integrated circuit design.

The process of creating an integrated circuit (IC), often referred to as very large scale integration (VLSI) or chip design, includes many steps, some of which are repeated iteratively. Generally, combinational logic gates and memory elements are integrated into a process referred to as logic synthesis to implement the desired functionality of the IC. This logic synthesis is ultimately transitioned into a layout of physical components or logic circuit elements (e.g., latches, flip-flops, and pins) in an arrangement that considers the timing, congestion, and power usage constraints of the IC design.

SUMMARY

According to a non-limiting embodiment, a block pinning optimization system comprises a hybrid block pinning optimization system includes a small-block processing module that processes a parent-level hierarchy including a plurality of child-level blocks and places a plurality of initial child-block pins corresponding to the child-level blocks. A child processing module places a logic element at a location within a given child block based on the placement of the initial child pins, discards the plurality of initial child pins while maintaining the location of the logic element, places at least one optimized child pin based at least in part on the location of the at least one logic element, and performs an abstraction operation on the logic element while maintaining the at least one child pin within the child blocks. A hierarchical large block synthesis (hLBS) processing module performs an hLBS operation to dissolve the plurality of child blocks, while maintaining the at least one optimized child pin.

According to another non-limiting embodiment, a computer-implemented method is provided for optimizing placement of child-block pins in a parent-level hierarchy. The method comprises placing, by a small-block processing module, a plurality of initial child-block pins corresponding to child-level blocks included in the parent-level hierarchy; and placing, by a child processing module, at least one logic element at a location within a given child block among the plurality of child blocks based on the placement of the initial child pins. The method further comprises discarding, by the child processing module, the plurality of initial child pins while maintaining the location of the at least one logic element; and placing, by the child processing module, at least one optimized child pin based at least in part on the location of the at least one logic element. The method further comprises performing, by the child processing module, an abstraction operation on the at least one logic element while maintaining the at least one child pin within the child blocks. The method further comprises performing, by a hierarchical large block synthesis (hLBS) module, an hLBS operation to dissolve the plurality of child blocks, while maintaining the at least one optimized child pin.

According to yet another non-limiting embodiment, a computer program product is provided to control a controller to optimize placement of child-block pins in a parent-level hierarchy. The computer program product comprises a computer readable storage medium having program instructions embodied therewith. The program instructions are executable by the controller to perform operations comprising placing, by a small-block processing module, a plurality of initial child-block pins corresponding to child-level blocks included in the parent-level hierarchy; and placing, by a child processing module, at least one logic element at a location within a given child block among the plurality of child blocks based on the placement of the initial child pins. The operations further comprise discarding, by the child processing module, the plurality of initial child pins while maintaining the location of the at least one logic element; and placing, by the child processing module, at least one optimized child pin based at least in part on the location of the at least one logic element. The operations further comprise performing, by the child processing module, an abstraction operation on the at least one logic element while maintaining the at least one child pin within the child blocks. The operations further comprise performing, by a hierarchical large block synthesis (hLBS) module, an hLBS operation to dissolve the plurality of child blocks, while maintaining the at least one optimized child pin.

Other embodiments of the present invention implement features of the above-described method and operations in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
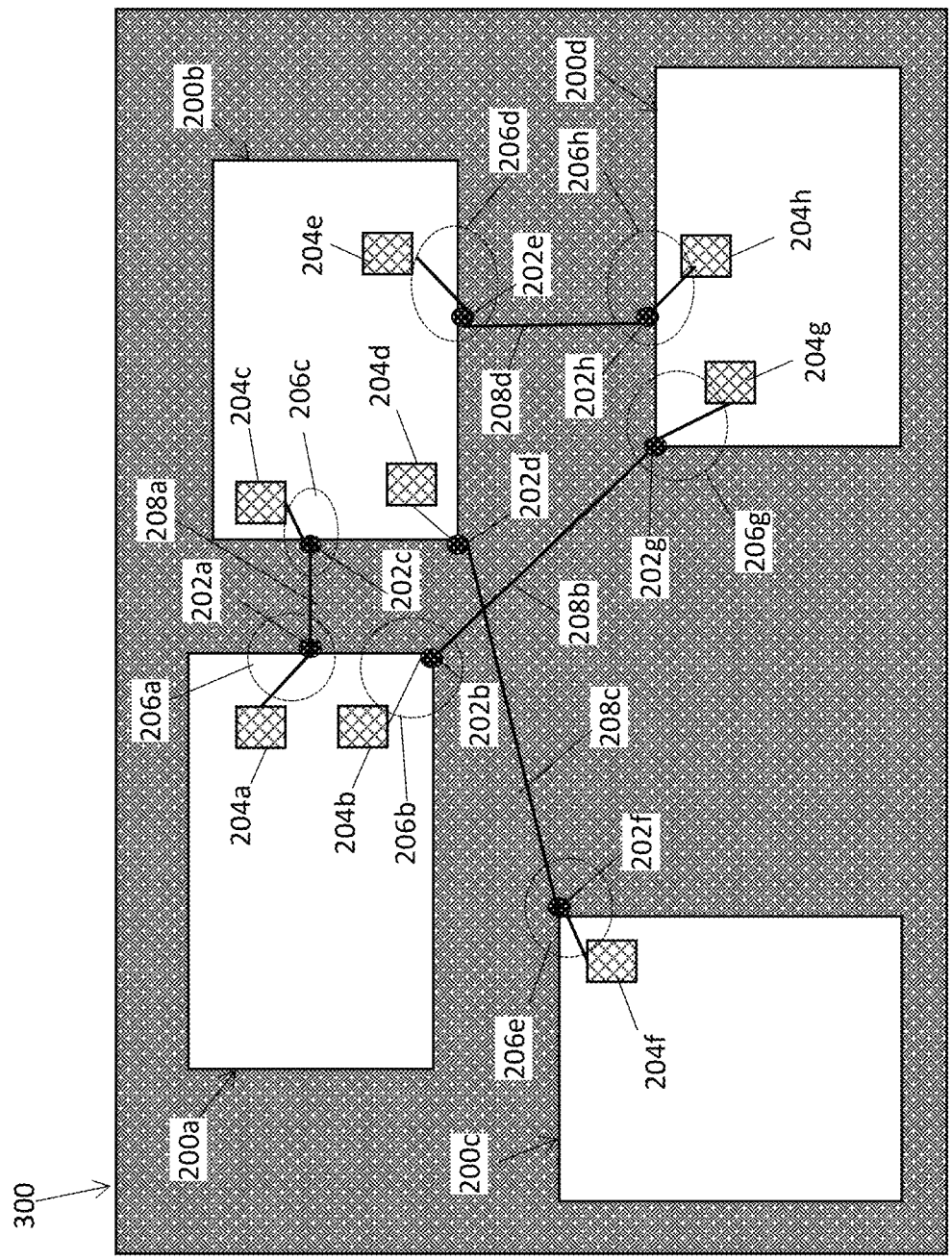
FIG. 1 is a block diagram depicting child block pin placement according to a conventional "tops-down" approach.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Cell placement in semiconductor fabrication involves a determination of where particular cells should optimally (or near-optimally) be located on the surface of an integrated circuit (IC) device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn-around time and enhanced chip performance. Several different programming languages have been created for electronic design automation (EDA), including Verilog, Very High-Speed Integrated Circuits Program (VHSIC) hardware description language (VHDL) and timing diagram markup language (TDML). A typical EDA system receives one or more high level behavioral descriptions of an IC device, and translates this high level design language description into netlists of various levels of abstraction. These netlists serve as a record of all of the nets, or interconnections, between the cell pins, including information about the various components such as transistors, resistors and capacitors Current microprocessor trends are integrating traditionally custom designs with random logic macros (RLMs) into very large IC designs. In some cases, entire microprocessor units are designed using an automated synthesis flow that integrates these traditional custom designs and RLMs. This type of merged synthesis run is referred to as large block synthesis (LBS). The LBS blocks, i.e., sets of cells or logic modules, require handling dataflow designs differently than traditional RLMs. In this process the entire logic is usually flattened out, and timing-critical logic portions can be pre-optimized in order to improve the overall result. This pre-optimization uses multiple copies (instances) of the same block of logic whose cells have already been placed and routed. These hard-bounded blocks are fed into the flat synthesis One particular type of LBS is referred to as "hierarchical large block synthesis" (hLBS), which allows for lifting restrictions requiring logic elements to remain inside their own fixed boundary, i.e., within a given child block or macro. In the hLBS approach, hLBS blocks (e.g., child blocks) are designed using non-fixed or "soft-boundaries", which can be removed or "dissolved" at the lowest layer of hierarchy after undergoing a level of physical design (PD) flow (typically prior to clock optimization and routing). In this manner, the placement and layout of logic elements established in the previously existing soft-boundaries of the child block can now be considered at a level of hierarchy (e.g., the parent-level) so as to improve the overall optimization of the hLBS design.

Pin placement strategies aim to place and locate pins in a given block such that wire routings in the hierarchy are straight (or substantially straight) and direct rather than detoured or scenic to achieve high-performance timing goals. Traditionally, two known approaches have been utilized to perform block pin location and placements at the child block hierarchy level (simply referred to herein as "the child block").

A first approach illustrated in FIG. 1 is referred to as a "tops-down" approach (also referred to as "top-down" design). When performing the tops-down approach, a tops-down pin assignment is established after placement of initial child blocks 200a-200d in a parent-level hierarchy 300. The established top-level connectivity and timing then drive the placement of the pins 902a-902h on the child blocks 200a-200d. Accordingly, the pins 902a-902h can be located at the outer-most perimeter of a corresponding block 200a-200d so as to reduce the length of wiring routes between logic elements 204a-204h and the length of wiring external wiring routes 208a-208d. The tops-down approach, however, does not take into account component placement and locations internal to a given child block 200a-200d. Consequently, the wire-routing design is susceptible to wiring detours and scenic routing 206a-206h around internally placed components that can cause undesirable timing violations as well as internal routing congestion.

Figure 2:
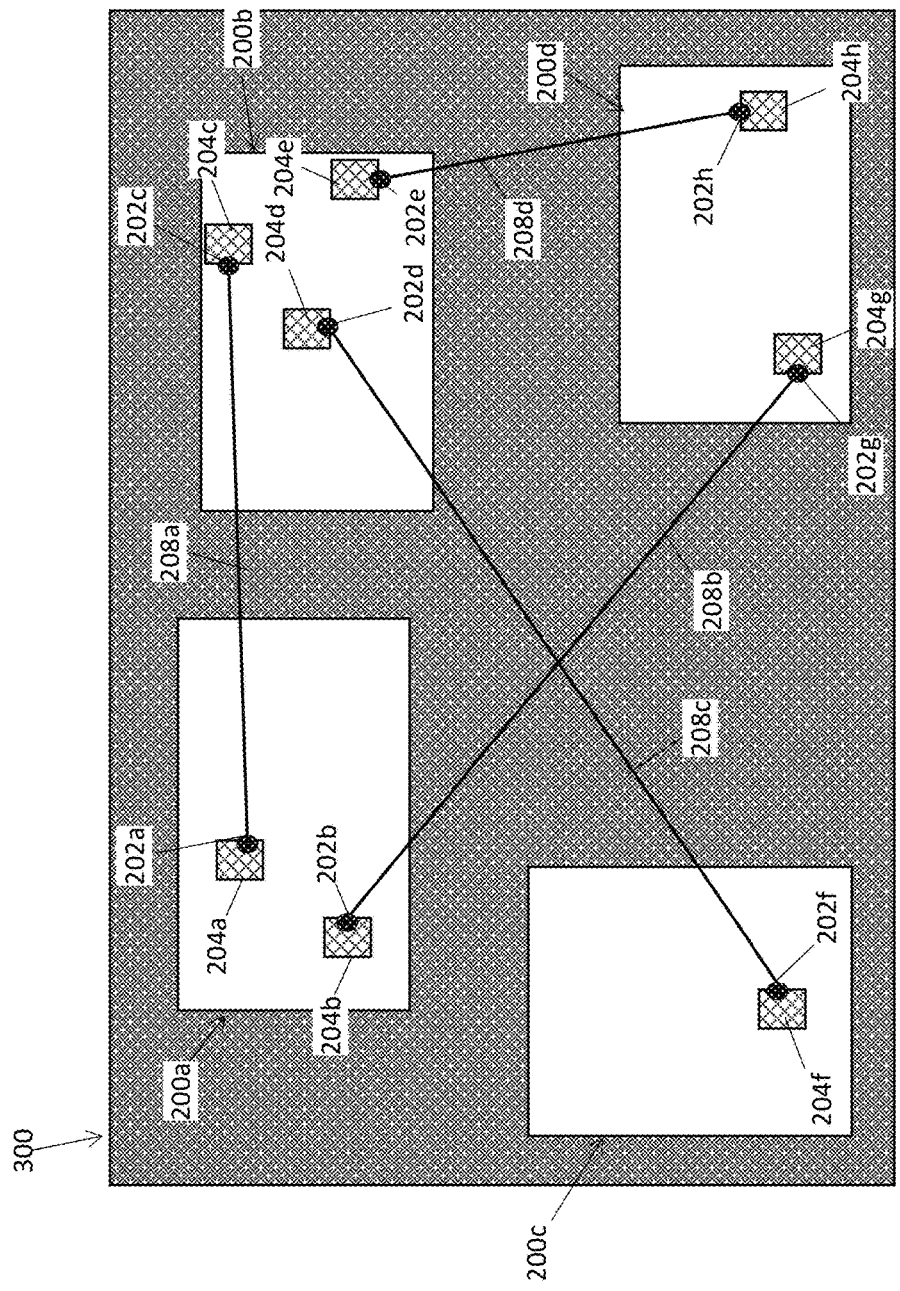
FIG. 2 is a block diagram depicting child block pin placement according to a conventional "bottoms-up" approach.

A second approach illustrated in FIG. 2 is referred to as a "bottoms-up" approach (also referred to as "bottom-up" design). The bottoms-up approach considers the locations the logic circuit elements 204a-204h (e.g., gates, latches, flip-flops, buffers, inverters, etc.) within a given child block 200a-200d, and places pins 202a-202h at the specific locations of a corresponding placed logic circuit elements 204a-204h within the corresponding child block 200a-200d. The bottoms-up approach, however, may result in undesirable internal placement of the logic circuit elements 204a-204h within the child blocks 200a-200d because there is no knowledge of where the signals are going external to the blocks 200a-200d. In addition, the wiring routes 208a-208d between pin pairings are not considered at the parent level 300 because the pins 202a-202h are located and placed internally of the child block 200a-200d. As a result, the bottoms-up approach can result in an overall increase in the length of the wire routes 208a-208d.

Various embodiments of the present invention address one or more of the limitations of pin placement and location strategies described above by providing a hybrid block pinning optimization system configured to perform a hybrid block pinning optimization process. The hybrid block pinning optimization process described herein includes a novel method for locating and placing pins in a logic block (e.g., a child logic block) that combines the benefits of a tops-down approach with the benefits of a bottoms-up approach.

Figure 3:
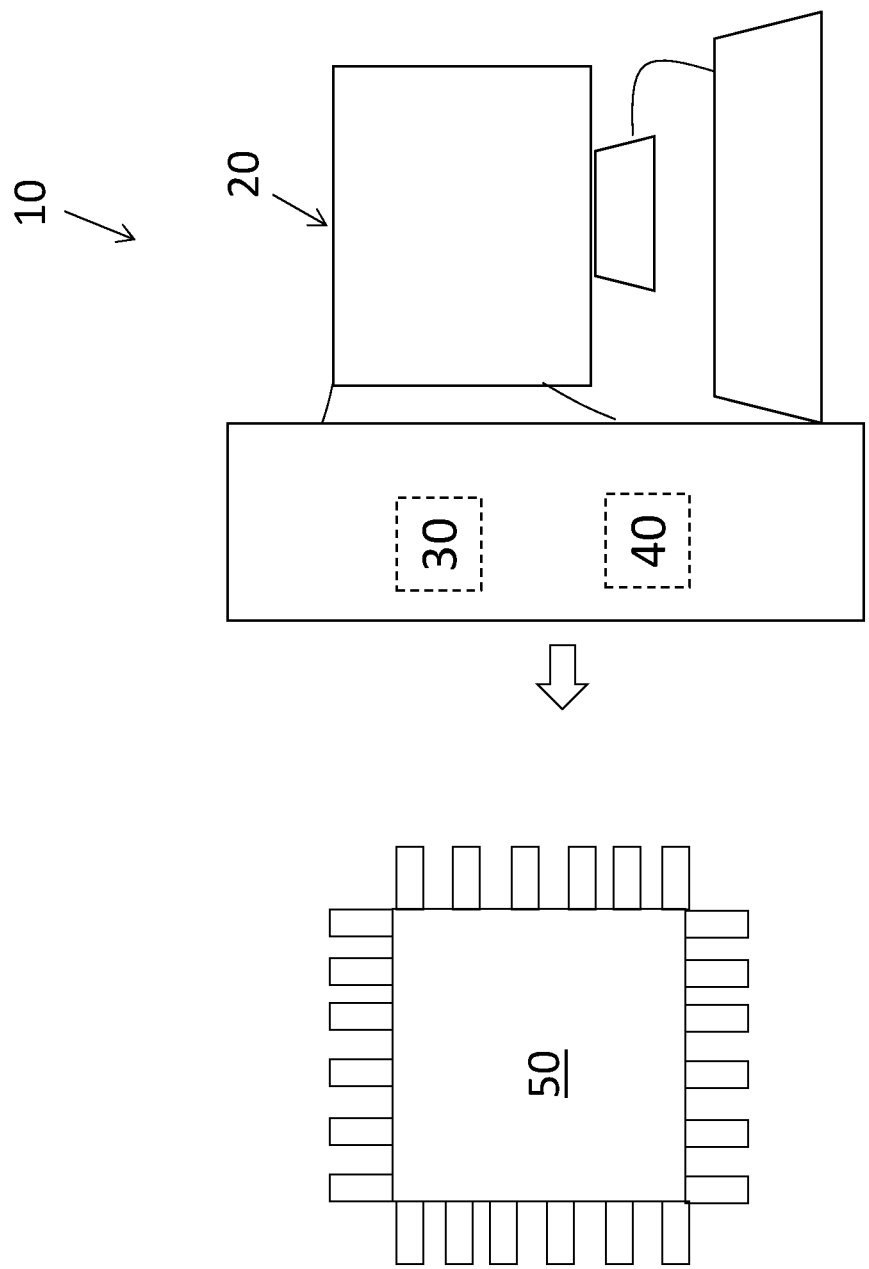
FIG. 3 is a block diagram of a system configured to fabricate an integrated circuit (IC) according to a non-limiting embodiment of the present disclosure.

With reference now to FIG. 3, a system 10 configured to fabricate an IC 50 is illustrated according to a non-limiting embodiment of the present invention. The system 10 includes processing circuitry 20 used to generate the design that is ultimately fabricated into the IC 50. The processing circuity 20 includes one or more processors 30 and memory 40 storing one or more software programs, code, and/or applications (collectively referred to as software).

The software can include, but is not limited to, computer readable program instructions for carrying out operations of the present invention, assembler instructions, instruction-set-architecture (ISA) instructions, traffic generator and simulator programs, workload traces, cache layout information, instruction and data addresses, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The memory 40 can also store computer readable program instructions, which may execute entirely on the user's computer, partly on the user's computer, as a stand-alone software package, partly on the user's computer and partly on a remote computer or entirely on the remote computer or server.

The memory 40 can also include software that establishes an IC simulator capable of defining, capturing, and/or manipulating design specifications of an IC in a hardware description language (HDL), such as VHDL (very high speed integrated circuit hardware description language, IEEE standard 1076) or Verilog® (IEEE standard 1364; "Verilog" is a registered trade mark of Cadence Design Systems, Inc.). The resulting HDL description typically characterizes the IC at a level of abstraction, such as a register transfer level (RTL), or a behavioral level.

A compiler is used to transform the HDL description into a "compiled model" of the IC. A simulator is then used to verify proper functional operation of the compiled model according to the design specification. Once the compiled model has been functionally verified, a synthesizer is used to map the compiled model to technology-specific logic gate structures, producing a logic level "netlist." Following further functional verification and/or timing verification, suitable positions of the logic gate structures of the netlist relative to one another are determined.

The steps involved in the fabrication of the integrated circuit 50 are well-known and briefly described herein. Once the physical layout is finalized, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 4.

Figure 4:
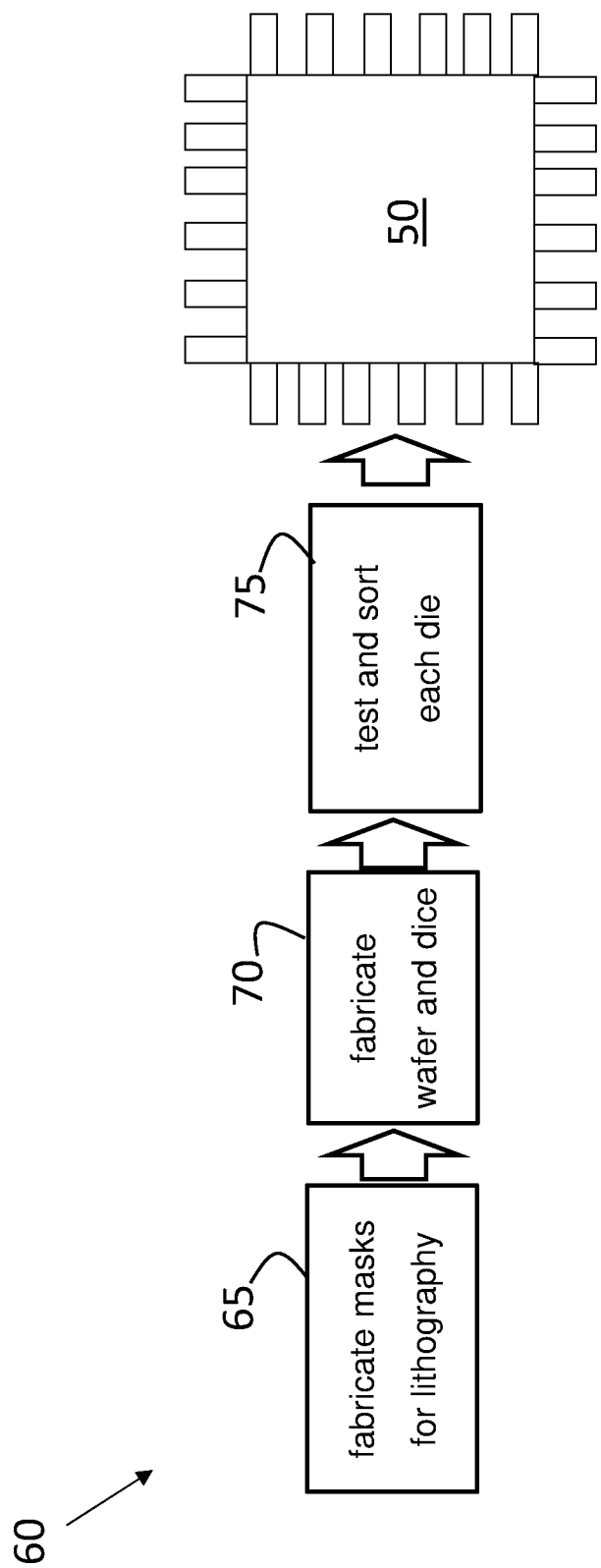
FIG. 4 is a block diagram depicting a process flow for fabricating an integrated circuit according to a non-limiting embodiment of the invention.

Turning to FIG. 4, a process flow 60 for fabricating the integrated circuit 50 is illustrated according to a non-limiting embodiment of the invention. Once the physical design data is obtained, the integrated circuit 50 can be fabricated according to known processes. For example, a wafer with multiple copies of the final design is fabricated and cut (i.e., diced) such that each die is one copy of the integrated circuit 50. At block 65, the processes include fabricating masks for lithography (e.g., transistor masks, diode masks, and metallization masks) based on the finalized physical layout. At block 70, fabricating the wafer includes using the masks to perform photolithography and etching. Once the wafer is diced, testing and sorting each die is performed, at block 75, to filter out any faulty die before providing the fabricated integrated circuit 50.

Figure 5:
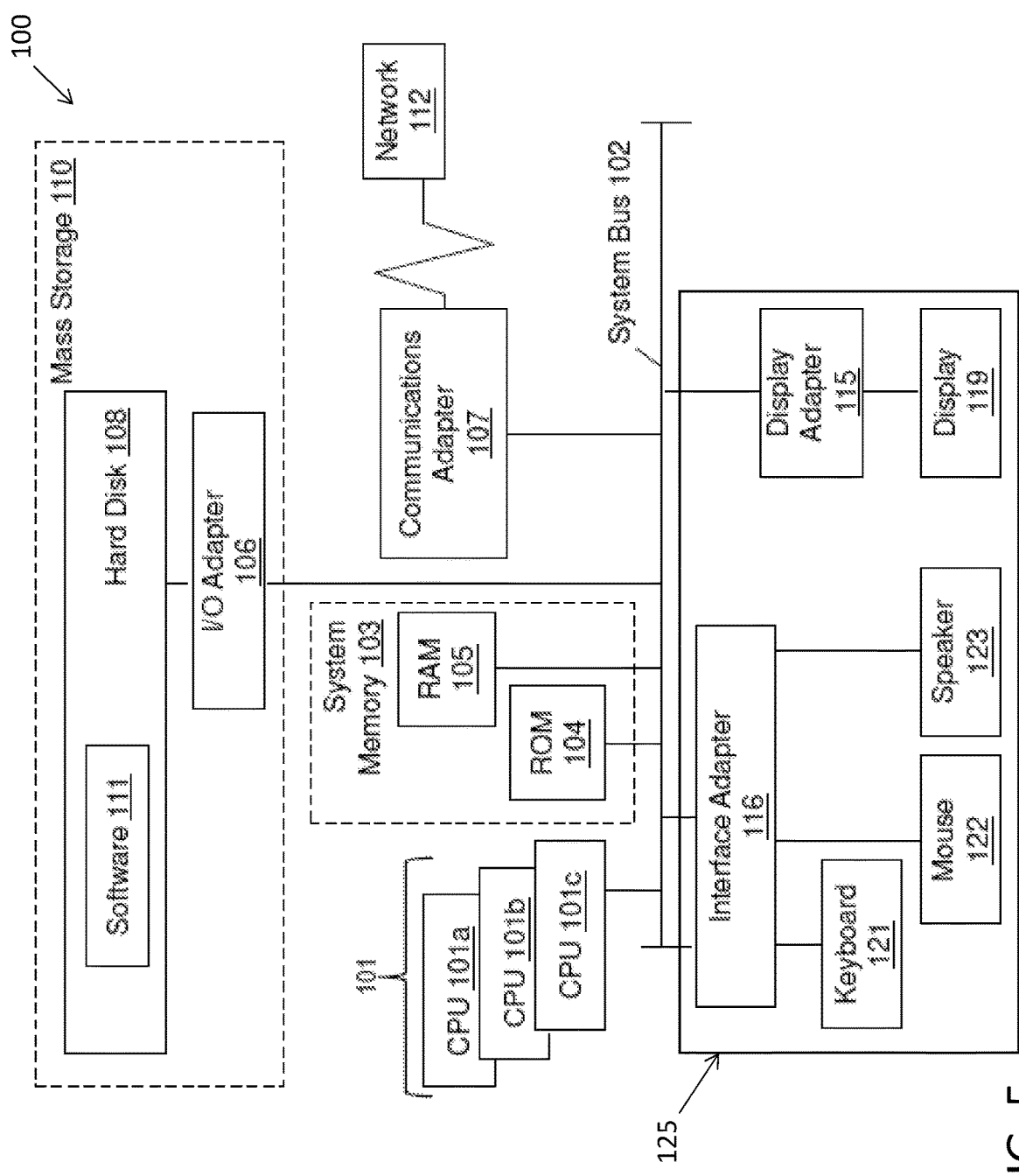
FIG. 5 depicts a block diagram of an example computer system for use in conjunction with a non-limiting embodiment of the present disclosure.

FIG. 5 depicts a block diagram of an example computer system 100 for use in conjunction with one or more embodiments of the present invention. The computer system 100 can operate as a special purpose objective-driven test case generation system capable of optimizing the placement of block pins in an IC design that that combines the benefits of a tops-down approach with the benefits of a bottoms-up approach.

The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 5.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. The keyboard 121, a mouse 122, a speaker 123, interface adapter 116, display 119, and display adapter 115 can be collectively referred to as an I/O interface 125 or graphical user interface GUI 125. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 5, the computer system 100 includes processing capability in the form of the processors 101, and storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 5 is not intended to indicate that the computer system 100 is to include all of the components shown in FIG. 5. Rather, the computer system 100 can include any appropriate fewer or additional components not illustrated in FIG. 5 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 6:
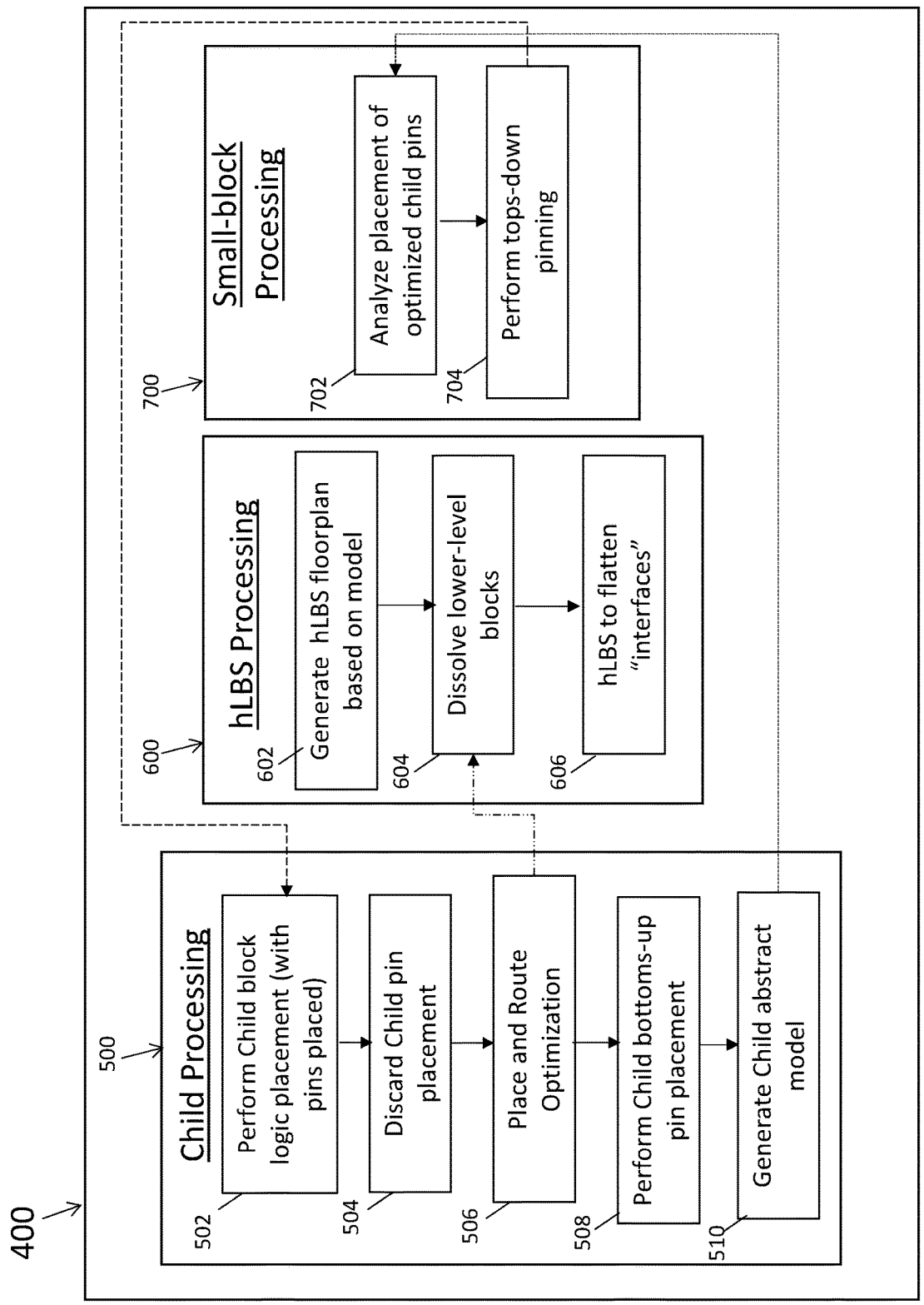
FIG. 6 is a block diagram depicting a hybrid block pinning optimization system according to a non-limiting embodiment of the present disclosure.

With reference now to FIG. 6, a hybrid block pinning optimization system 400 is illustrated according to a non-limiting embodiment of the present invention. As described herein, the hybrid block pinning optimization system 400 can be operated by the system 10 and implemented by system 100 to perform a block pinning optimization process. The hybrid block pinning optimization system 400 includes a child processing module 500, an hLBS module 600, and a small-block processing module 700. The child processing module 500, hLBS module 600, and small-block processing module 700 are capable of sharing data (e.g., abstract models, netlists, etc.) between one another. In addition, the child processing module 500, hLBS module 600 and/or small-block processing module 700 can operate in parallel with one another. Any one of the child processing module 500, the hLBS module 600, and/or the small-block processing module 700 can be constructed as an electronic hardware controller that includes memory and a processor configured to execute algorithms and computer-readable program instructions stored in the memory. In addition, one or more of the child processing module 500, hLBS module 600, and a small-block processing module 700 can be embedded or integrated in a single controller.

The child processing module 500 is configured to process a hierarchy of blocks configured to contain one or more child logic elements (e.g., gates, latches, inverters, buffers, etc.). In one or more non-limiting embodiments, the child processing module 500 is configured to perform a block placement operation 502, a pin dissolution operation 504, a place and route optimization module 506, a pin bottoms-up placement operation 508, and a small-block model generation operation 510. The hLBS processing module 600 is configured to generate an hLBS floorplan based on a block model 602, perform a lower-level block dissolution operation 604, and perform an hLBS flattening operation 606. The small-block processing module 700 is configured to optimize a small-block model 702 and perform a tops-down pin placement operation 704. Accordingly, the child processing module 500, hLBS module 600, and a small-block processing module 700 can operate together to perform a block pinning optimization process. As described herein, the block pinning optimization process includes an initial child block placement operation, a pin dissolution operation, child pin placement optimization operation, a child block dissolution operation, and a child block dissolution operation.

Figure 7:
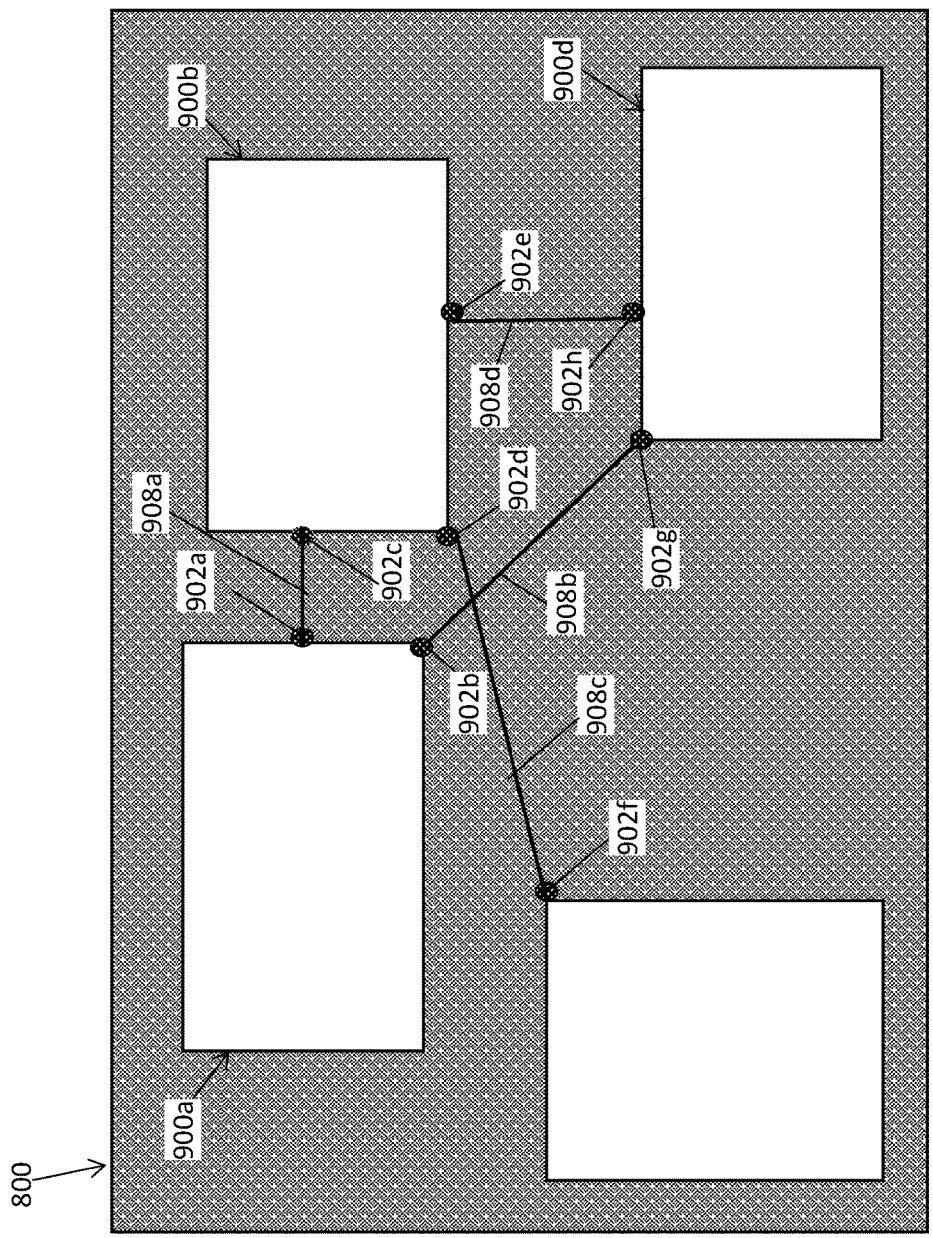
FIG. 7 is a block diagram depicting a parent-level hierarchy including a plurality of child-level blocks following an initial block placement operation performed by the hybrid block pinning optimization system according to a non-limiting embodiment of the present invention.

Turning now to FIG. 7, a block diagram depicts a first-level hierarchy 800 including a plurality of lower-level blocks 900a, 900b, 900c and 900d. In this example, blocks 900a, 900b, 900c and 900d are collectively referred to as blocks 900a-900d) following an initial block placement operation performed by the hybrid block pinning optimization system 400 according to a non-limiting embodiment of the present invention. In this example, the first-level hierarchy 800 is referred to as a "parent-level" and the blocks 900a-900d are referred to as "child-blocks" 900a-900d.

As described herein, the small-block processing module 700 can operate in parallel with the processing module 500 and the hLBS module 600. Accordingly, the resulting placement can be achieved by performing a tops-down pin placement operation 704 by the small-block processing module 700. The initial child block placement operation performed by the small-block processing module 700 results in the placement of initial child pins 902a, 902b, 902c, 902d, 902e, 902f, 902g, 902h (collectively referred to as child pins 902a-902h) that correspond to their respective child blocks 900a-900d.

In one or more non-limiting embodiments, the tops-down pin placement operation determines the placement and location of the child pins 902a-902h based on timing requirements of the parent-level 800 (e.g., child timing requirements of one or more of the child blocks 900a-900d) and/or routing connectivity required by the first-level hierarchy 800. Thus, the child pins 902a-902h are initially placed independently from the internal logic design (e.g., independently from gates, latches, inverters, buffers, etc.) of their respective child blocks 900a-900d. In one or more non-limiting embodiments, the timing requirements are used to place the initial child pins 902a-902h at the outer-perimeter of the child blocks 900a-900d.

Figure 8:
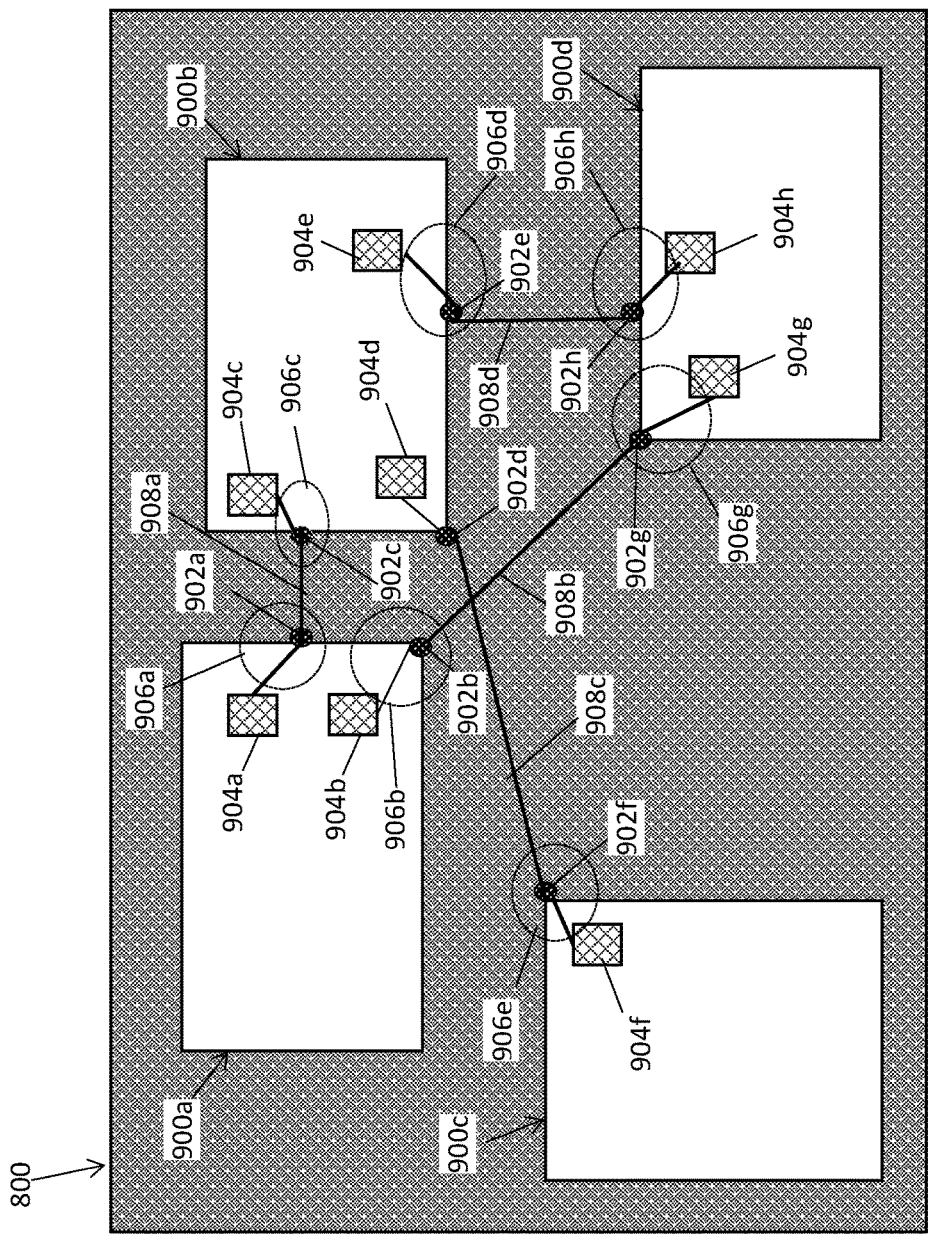
FIG. 8 is a block diagram depicting the parent-level hierarchy with pin placements following a child-block logic element placement operation included in the hybrid block pinning optimization process according to a non-limiting embodiment of the present disclosure.

Turning to FIG. 8, the tops-down pin placement results performed by the small-block processing module 700 are fed to the child processing module 500 to perform initial placement of logic elements 904a-904h according to a child-block logic element placement operation 502. The child block placement operation 502 determines the location and placement one or more child logic elements 904a, 904b, 904c, 904d, 904e, 904f, 904g, 904h (collectively referred to as child logic elements 904a-904h) within a given child block 900a-900d based on the placement of the child pins 902a-902h. The various child logic elements 904a-904h include, for example, gates, latches, inverters, buffers, etc.

In one or more non-limiting embodiments, the place and route optimization module 506 can perform a logic-to-pin place and route optimization operation that determines the placement of the logic elements 904a-904h by optimizing a signal route between a given logic element 904a-904h and respective child pin 902a-902h. The logic-to-pin place and route optimization can be performed by determining timing requirements, slack requirements, etc., between a given logic element 904a-904h and a respective child pin 902a-902h, and placing a logic element 904a-904h with respect to a respective child pin 902a-902h to achieve the timing requirements, slack requirements, etc.

With continued reference to FIG. 8, the placement of the child logic elements 904a-904h the child pins 902a-902h may result in scenic routing path segments 906a, 906b, 906c, 906d, 906e, 906f, 906g, and 906h (collectively referred to as scenic routing path segments 906a-906h) to be created in the overall initial routing paths 908a, 908b, 908c and 908d. These scenic routing path segments 906a-906h occur, for example, between a given child logic element 904a-904h and a respective child pin 902a-902h. The block pinning optimization system 400, however, subsequently replaces the routing paths 908a-908d that include the scenic routing path segments 906a-906h with non-scenic routing paths (i.e., direct routing paths) to improve timing requirements and optimize the pin placements realized by both the parent-level 800 and the child-blocks 900a-900d as described in greater detail below.

Figure 9:
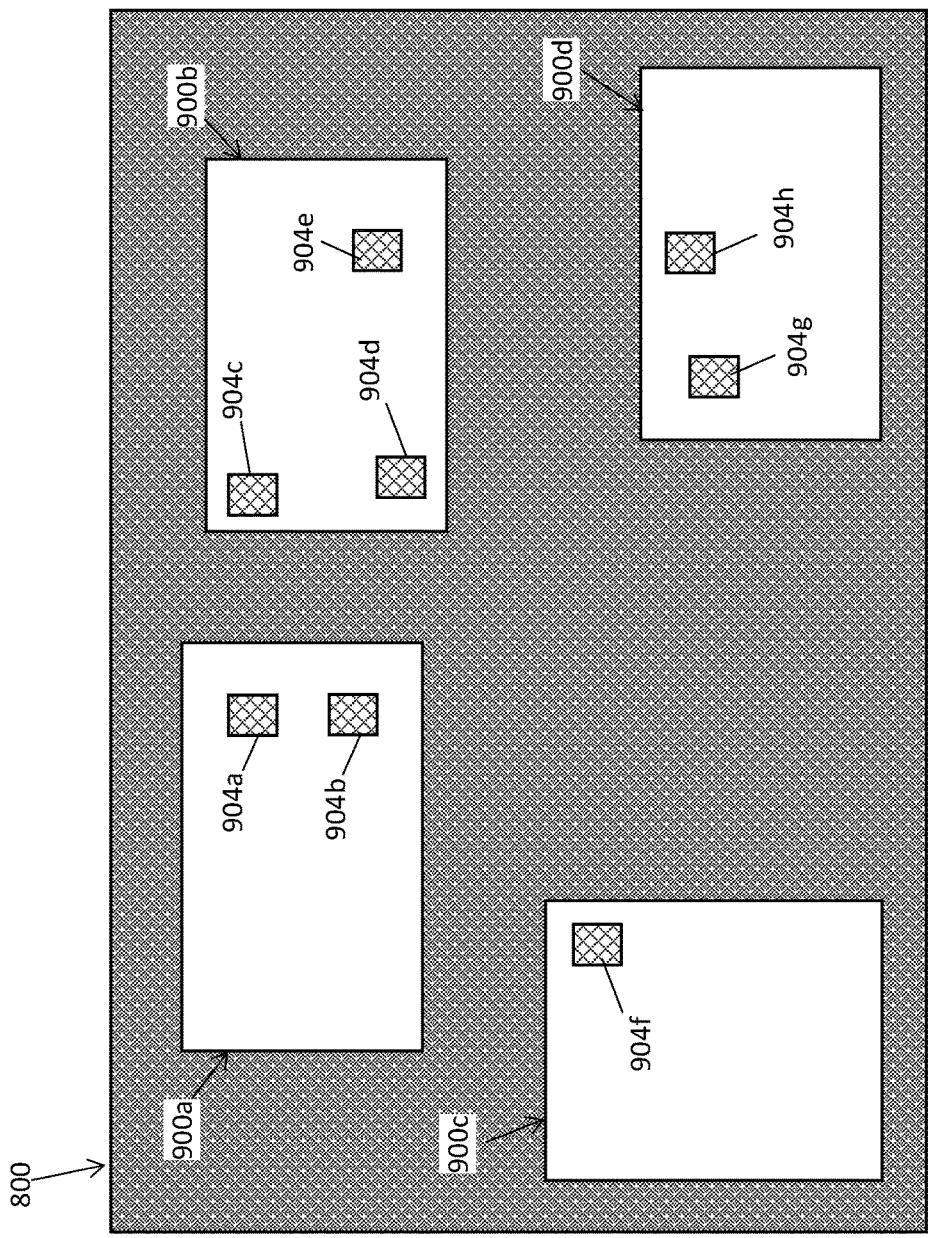
FIG. 9 is a block diagram depicting the child blocks following an initial child-pin discarding operation according to a non-limiting embodiment of the present disclosure.

Turning to FIG. 9, the parent-level hierarchy 800 is illustrated following an initial child-pin dissolution operation 504 performed by the child-processing module 500 according to a non-limiting embodiment of the present invention. At this stage, the child processing module 500 discards the initial child pins 902a-902h, along with initial routing paths 908a-908h and the scenic routing paths 906a-906h. The placement of the child logic elements 904a-904h, however, are maintained within the child blocks 900a-900d.

Figure 10:
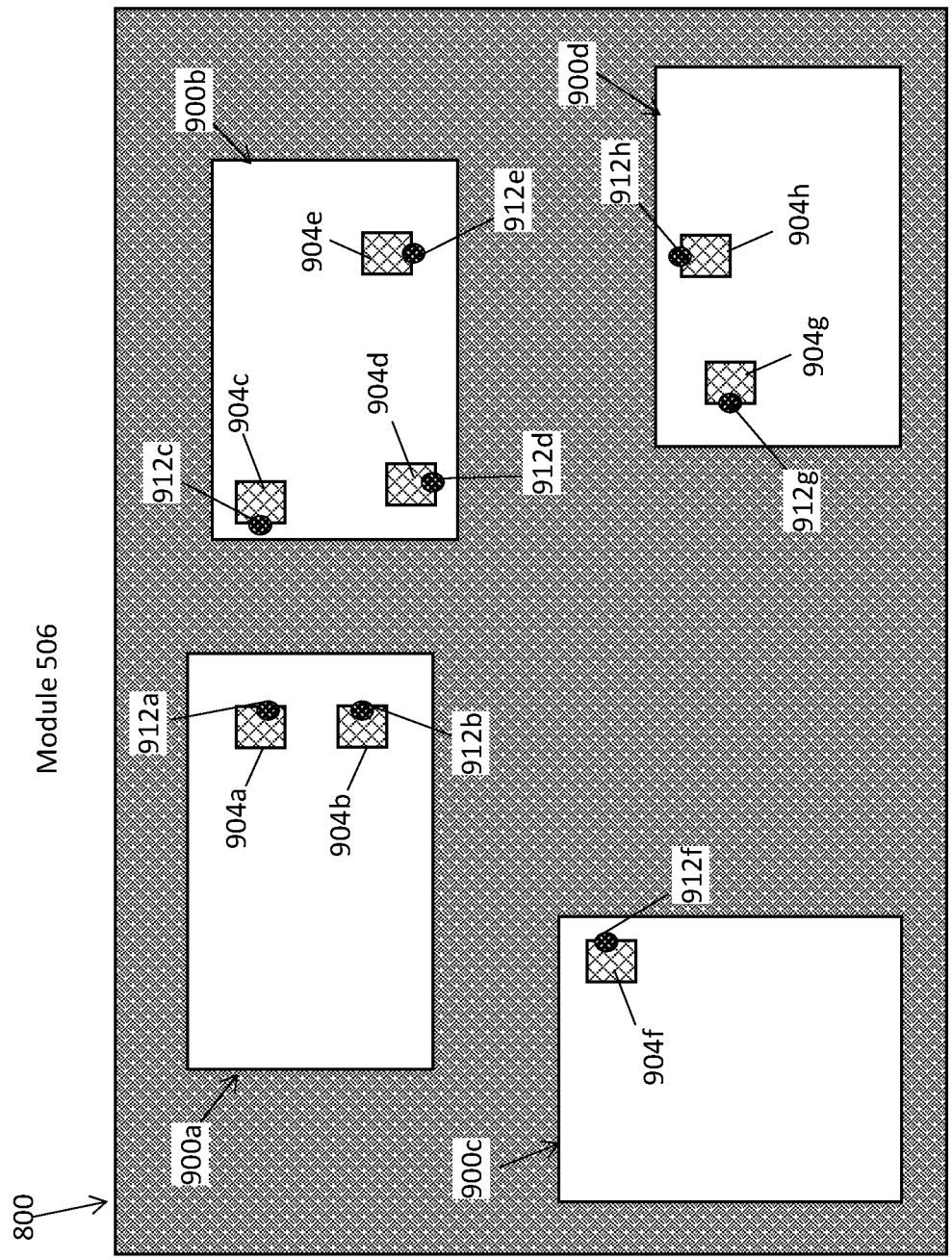
FIG. 10 is a block diagram depicting the parent-level hierarchy following the placement of optimized child-block pins according to a non-limiting embodiment of the invention.

Referring now to FIG. 10, the parent-level hierarchy 800 is illustrated following the placement of child-block pins by the child-processing module 500 according to a non-limiting embodiment. At this stage, the child-processing module 500 performs a bottoms-up pin placement operation 508 to establish optimal locations of child-block pins 912a-912h. As described herein, the bottoms-up pin placement operation 508 utilizes the specific locations of the maintained logic circuit elements 904-904h within the corresponding child blocks 900a-900d to place child-block pins 912a, 912b, 912c, 912d, 912e, 912f, 912g, and 912h (collectively referred to as optimized child pins 912a-912h) at optimized locations within (i.e., internally) the child blocks 900a-900d.

Figure 11:
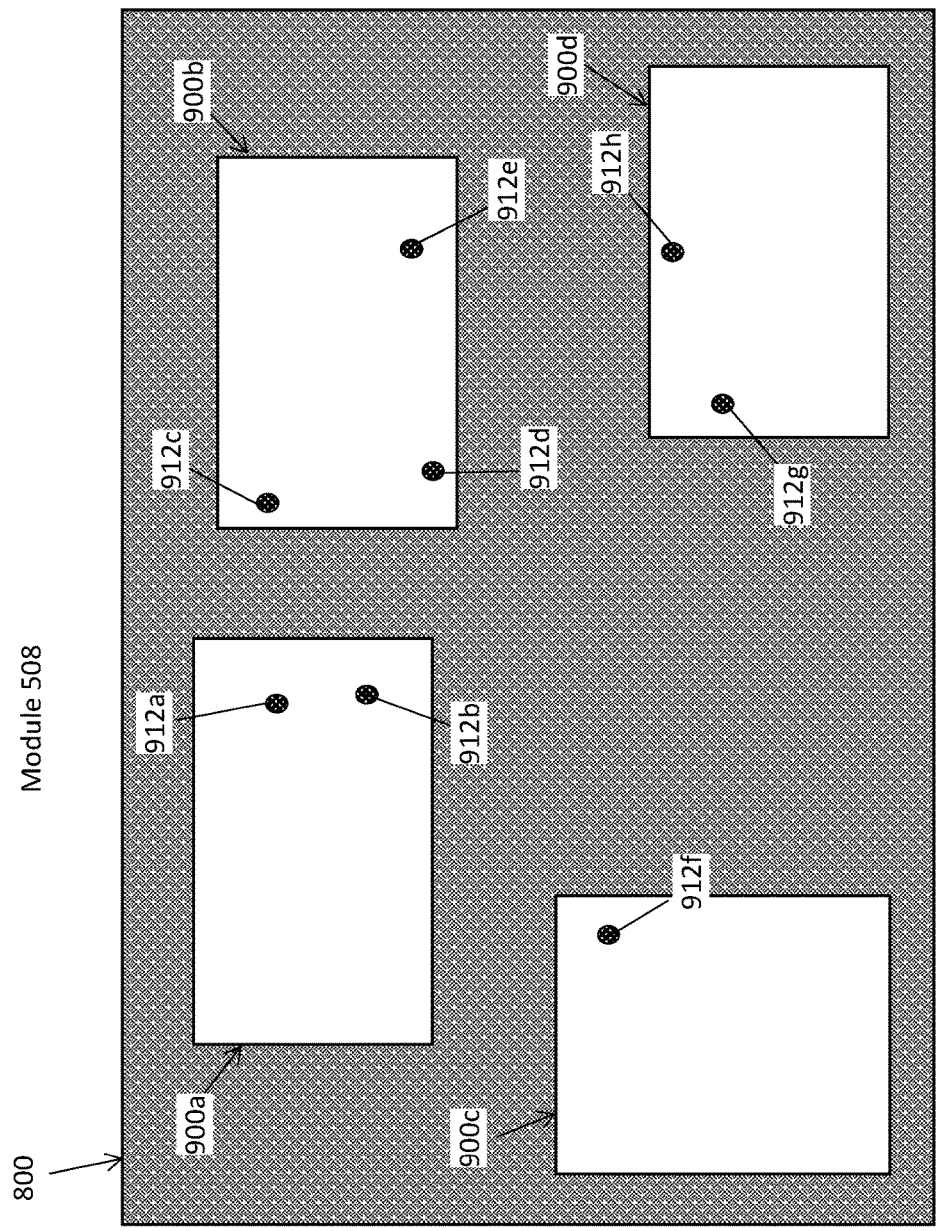
FIG. 11 is a block diagram depicting the parent-level hierarchy after performing a child-block abstraction operation according to a non-limiting embodiment.

Turning to FIG. 11, the parent-level hierarchy 800 is illustrated after the child-processing module 500 performs a child-block abstraction operation 510 according to a non-limiting embodiment. The child-block abstraction operation 510 "flattens" the child blocks 9004a-900d and effectively removes the logic circuit elements 904-904h within the corresponding child blocks 900a-900d, from the parent level perspective, while maintaining the optimized child pins 912a-912h. The optimized pin placement results obtained according to the child-block abstraction operation 510 are then fed from the child processing module 500 to the small-block processing module 700 to perform established optimized routing paths.

Figure 12:
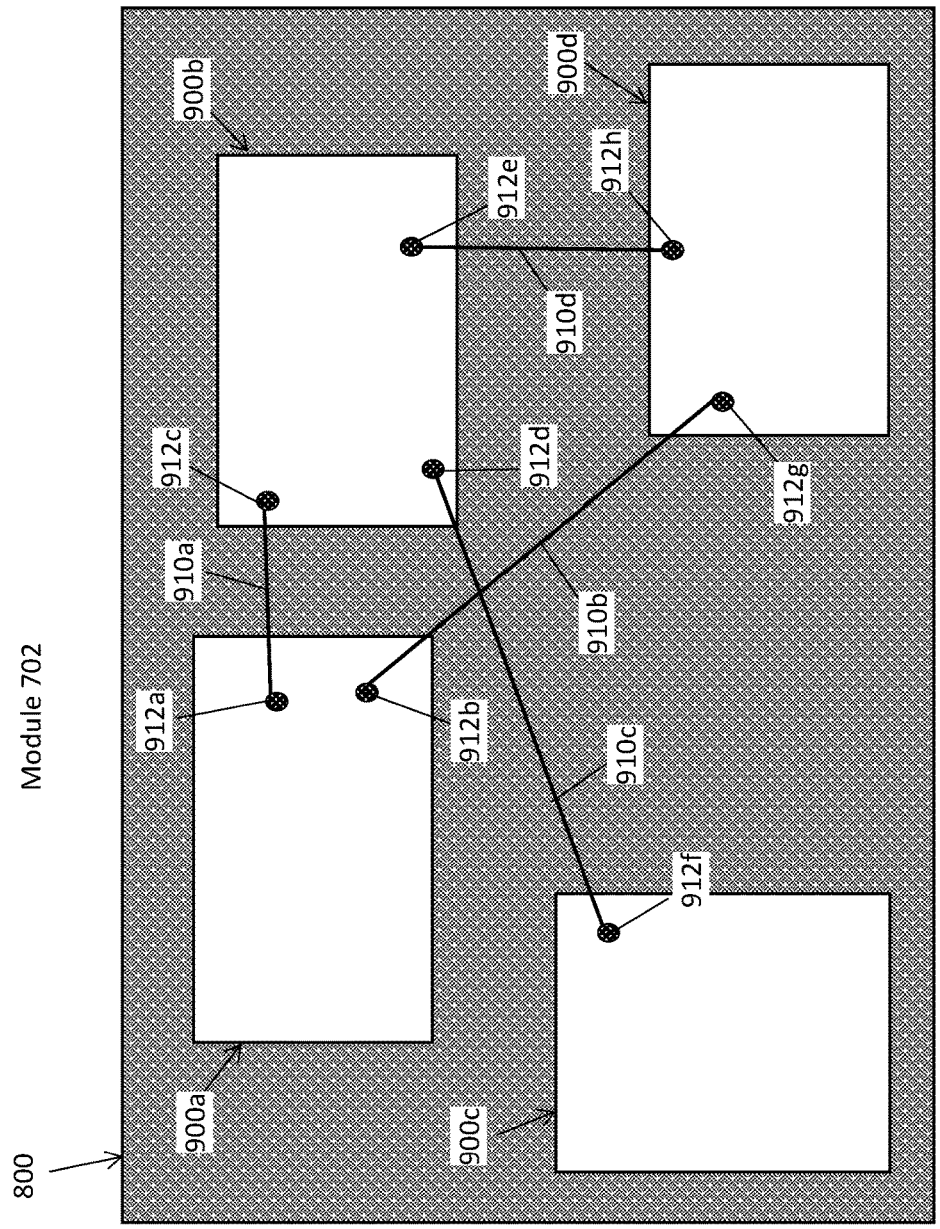
FIG. 12 is a block diagram depicting the parent-level hierarchy following a pin-to-pin place and route optimization operation according to a non-limiting embodiment of the invention.

Referring to FIG. 12, the parent-level hierarchy 800 is illustrated following a pin-to-pin place and route optimization operation performed by the block processing module 700. The pin-to-pin place and route optimization operation is similar to the logic-to-pin place and route optimization described above. However, rather than performing a place and route optimization between a logic element and a child pin, the place and route optimization is performed between a first optimized pin (e.g., optimized child pin 912a) included in a first child block (e.g., child block 900a) and a second optimized pin (e.g., optimized child pin 912c) included in a second child block (e.g., child block 900b).

In one or more non-limiting embodiments, the block processing module 700 can perform an optimized child pin placement analysis 702, and determine routing paths directly between a pair of optimized child pins. In this manner, direct signal routing paths 910a, 910b, 910c and 910d (collectively referred to as direct signal routing paths 910a-910d) are generated which exclude the scenic routing path segments 906a-906h described above (e.g., see FIG. 8). The small-block processing module 700 can utilize the abstracted child-blocks 900a-900d with direct routing paths 910a-910d between optimized child pins 912a-912h to generate a large-block model.

As described above, the child abstract model 510 generated by the child processing module 500 is delivered to the small-block processing module 700. The child processing module 500 can also deliver the child abstract model 510 to the hLBS processing module 600 to perform an hLBS operation on the child blocks 900a-900d. In one or more non-limiting embodiments, the child abstract model 510 is delivered in parallel to the small-block processing module 700 and the hLBS processing module 600.

Figure 13:
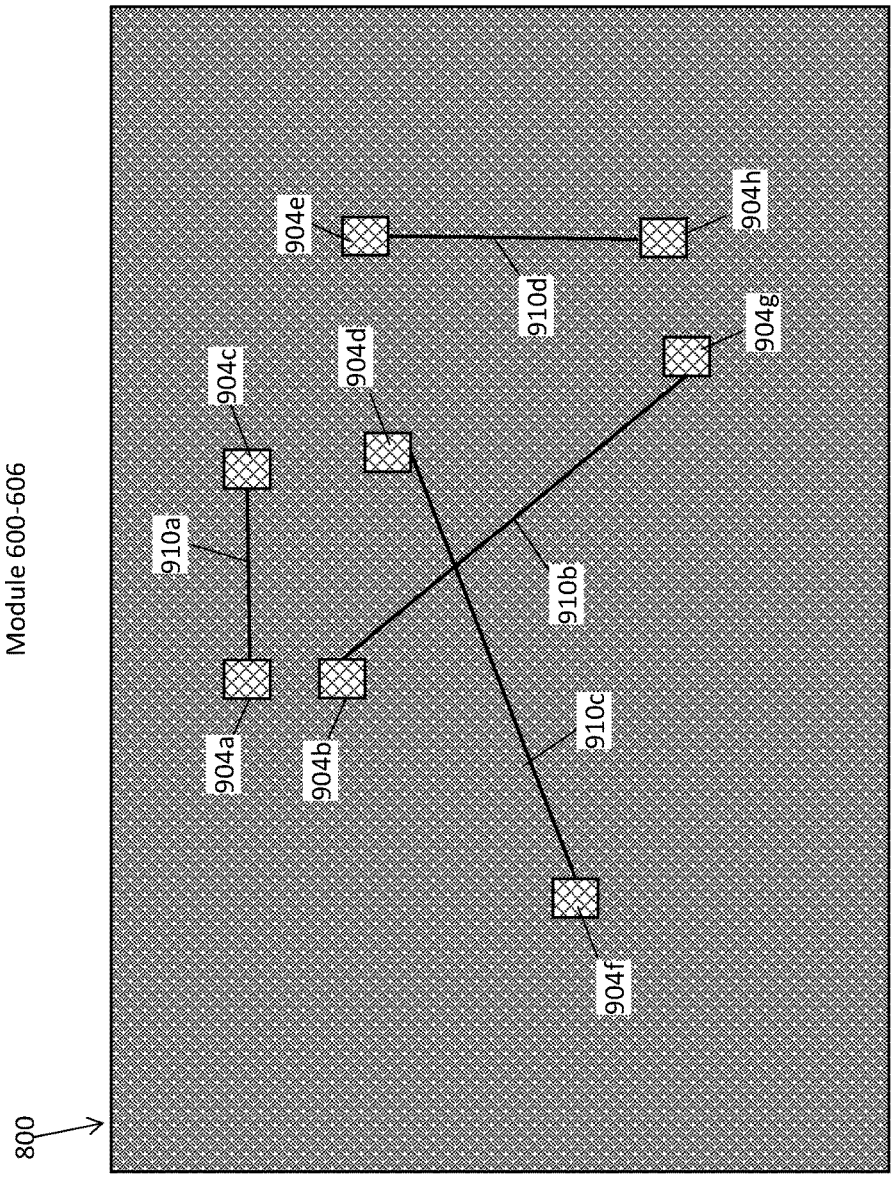
FIG. 13 is a block diagram depicting the parent-level hierarchy after dissolving the child blocks while maintaining the optimized child pins and routing paths according to a non-limiting embodiment of the invention.

Turning to FIG. 13, for example, the hLBS processing module 600 receives the parent-level hierarchy 800 from the child-processing module 500 after discarding the initial child-pins (see FIG. 9) and can generate an hLBS floorplan 602. Once the hLBS floorplan 602 is generated, the hLBS processing module 600 can dissolve the child blocks 900a-900d and corresponding pins 912a-912h in the hLBS floorplan 602. As a result, the child blocks 900a-900d no longer exist as this point and the child logic elements 904a-904h that were located in their respective child blocks 900a-900d are now located at the parent level 800. Accordingly, the hLBS processing module 600 maintains the logic elements 904a-904h at optimized locations, along with corresponding direct routing paths 910a-910d at the parent level such that the logic elements 904a-904h and/or direct routing paths 910a-910d can be further optimized from the parent level perspective. The operations performed by the child processing module 500, hLBS module 600, and small-block processing module 700 described in detail above facilitates a hybrid block pinning optimization system and corresponding method for locating and placing pins in a logic block (e.g., a child logic block) that combines the benefits of a tops-down approach with the benefits of a bottoms-up approach.

Figure 14:
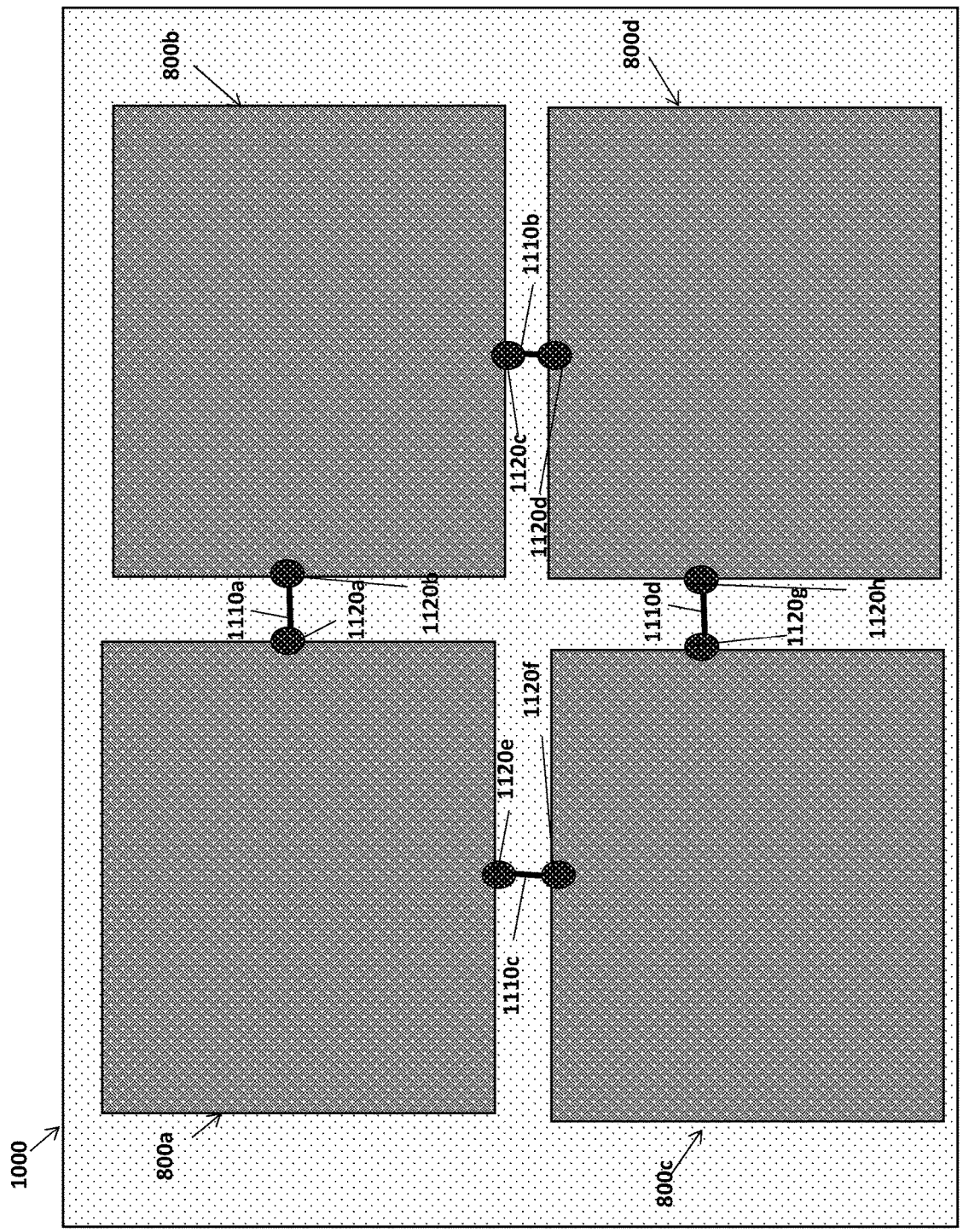
FIG. 14 depicts a grandparent level hierarchy that includes a plurality of abstracted parent-level hierarchies containing optimized placements of child pins and routing paths according to a non-limiting embodiment of the invention.

In one or more non-limiting embodiments, the flattened parent-level hierarchy 800 that includes the optimized the optimized child pins 912a-912h and corresponding direct routing paths 910a-910d can itself ultimately be abstracted and added to its own parent-level hierarchy (e.g., a grandparent level). Accordingly, FIG. 14 illustrates a grandparent level hierarchy 1000 that includes a plurality of abstracted parent-level hierarchies 800a-800d. Each of the parent-level hierarchies 800a-800d contain the optimized child pins 912a-912h and corresponding direct routing paths 910a-910d, and are abstracted according to the processes performed by the child processing module 500, hLBS module 600, and small-block processing module 700 as described above. Therefore, the details of hybrid block pinning optimization and abstraction operations will not be repeated for the sake of brevity.

As described herein, a hybrid block pinning optimization system is configured to perform a block pinning optimization process for optimally locating and placing pins in a lower-level logic block (e.g., a child logic block), which also results in optimal routing lengths that exclude scenic routing path segments. According to one or more non-limiting embodiments, the block pinning optimization system initially performs a tops-down child pin placement process. The tops-down child pin placement process places initial child pins corresponding to child blocks and can be performed in parallel with one or more top-level optimization procedures. Following the placement of the initial child pin placement, the block pinning optimization system places child-level logic elements and then discards the initial child pins after placing the child-level logic elements. The block pinning optimization system utilizes the location of child logic elements to determine optimal signal paths and then performs places optimized child pins based on the locations of the child logic elements and the optimal signal paths. In one or more non-limiting embodiments, the block pinning optimization system can then abstract the child logic elements while maintaining the optimized child pins. In this manner, hybrid block pinning optimization system combines the benefits of a tops-down approach with the benefits of a bottoms-up approach.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A hybrid block pinning optimization system comprising:
    small-block processing module configured to process a parent-level hierarchy including a plurality of child-level blocks and to place a plurality of initial child-block pins corresponding to the child-level blocks;
    a child processing module configured to place at least one logic element at a location within a given child block among the plurality of child blocks based on the placement of the initial child pins, discard the plurality of initial child pins while maintaining the location of the at least one logic element, place at least one optimized child pin based at least in part on the location of the at least one logic element, and perform an abstraction operation on the at least one logic element while maintaining the at least one child pin within the child blocks; and
    a hierarchical large block synthesis (hLBS) module configured to perform an hLBS operation to dissolve the plurality of child blocks, while maintaining the at least one optimized child pin.

2. The block pinning optimization system according to claim 1, wherein the small-block processing module determines the placement of the initial child pins is based at least in part on timing requirements of the parent-level hierarchy.

3. The block pinning optimization system according to claim 2, wherein the placement of the at least one logic element within a given child block is based on a route timing requirement between the at least one logic element located in the given child block and the initial child block pin of the given child block.

4. The block pinning optimization system according to claim 3, wherein a route segment between the at least one logic element and the initial child pin defines a scenic routing path segment.

5. The block pinning optimization system according to claim 4, wherein the child processing module is further configured to discard the initial child pins and the scenic routing path segment, while maintaining the at least one logic element.

6. The block pinning optimization system according to claim 5, wherein the child processing module places an optimized child pin on the logic gates placed within the child blocks.

7. The block pinning optimization system according to claim 6, wherein the child processing module performs a child block abstraction operation to dissolve the at least one logic element in the child blocks while maintain the placement of the optimized child pins.

8. The block pinning optimization system according to claim 7, wherein the child processing module creates a direct signal routing path between a first optimized child pin placed in a first child block among the plurality of child blocks and a second optimized child pin located in a second child block among the plurality of child blocks.

9. A computer-implemented method of optimizing placement of child-block pins in a parent-level hierarchy, the method comprising:
    placing, by a small-block processing module, a plurality of initial child-block pins corresponding to child-level blocks included in the parent-level hierarchy;
    placing, by a child processing module, at least one logic element at a location within a given child block among the plurality of child blocks based on the placement of the initial child pins;
    discarding, by the child processing module, the plurality of initial child pins while maintaining the location of the at least one logic element;
    placing, by the child processing module, at least one optimized child pin based at least in part on the location of the at least one logic element;
    performing, by the child processing module, an abstraction operation on the at least one logic element while maintaining the at least one child pin within the child blocks; and
    performing, by a hierarchical large block synthesis (hLBS) module, an hLBS operation to dissolve the plurality of child blocks, while maintaining the at least one optimized child pin.

10. The computer-implemented method according to claim 9, further comprising determining, by the small-block processing module, the placement of the initial child pins based at least in part on timing requirements of the parent-level hierarchy.

11. The computer-implemented method according to claim 10, further comprising determining the placement of the at least one logic element within a given child block based on a route timing requirement between the at least one logic element located in the given child block and the initial child block pin of the given child block.

12. The computer-implemented method according to claim 11, wherein a route segment between the at least one logic element and the initial child pin defines a scenic routing path segment.

13. The computer-implemented method according to claim 12, further comprising discarding, by the child processing module, the initial child pins and the scenic routing path segment, while maintaining the at least one logic element.

14. The computer-implemented method according to claim 13, further comprising placing, by the child processing module, an optimized child pin on the logic gates placed within the child blocks.

15. The computer-implemented method according to claim 14, further comprising performing, by the child processing module, a child block abstraction operation to dissolve the at least one logic element in the child blocks while maintain the placement of the optimized child pins.

16. The computer-implemented method according to claim 15, further comprising creating, by the child processing module, a direct signal routing path between a first optimized child pin placed in a first child block among the plurality of child blocks and a second optimized child pin located in a second child block among the plurality of child blocks.

17. A computer program product to control a controller to optimize placement of child-block pins in a parent-level hierarchy, the computer program product comprising a computer readable storage medium having program instructions embodied therewith, the program instructions executable by the controller to perform operations comprising:
   placing, by a small-block processing module, a plurality of initial child-block pins corresponding to child-level blocks included in the parent-level hierarchy;
   placing, by a child processing module, at least one logic element at a location within a given child block among the plurality of child blocks based on the placement of the initial child pins;
   discarding, by the child processing module, the plurality of initial child pins while maintaining the location of the at least one logic element;
   placing, by the child processing module, at least one optimized child pin based at least in part on the location of the at least one logic element; and
   performing, by the child processing module, an abstraction operation on the at least one logic element while maintaining the at least one child pin within the child blocks; and
   performing, by a hierarchical large block synthesis (hLBS) module, an hLBS operation to dissolve the plurality of child blocks, while maintaining the at least one optimized child pin.

18. The computer program product according to claim 17, wherein the operations further comprise:
   determining, by the small-block processing module, the placement of the initial child pins based at least in part on timing requirements of the parent-level hierarchy; and
   determining the placement of the at least one logic element within a given child block based on a route timing requirement between the at least one logic element located in the given child block and the initial child block pin of the given child block.

19. The computer program product according to claim 18, wherein the operations further comprise:
   discarding, by the child processing module, the initial child pins and a scenic routing path segment, while maintaining the at least one logic element, wherein a route segment between the at least one logic element and the initial child pin defines a scenic routing path segment; and
   placing, by the child processing module, an optimized child pin on the logic gates placed within the child blocks.

20. The computer program product according to claim 19, wherein the operations further comprise:
   performing, by the child processing module, a child block abstraction operation to dissolve the at least one logic element in the child blocks while maintain the placement of the optimized child pins; and
   creating, by the child processing module, a direct signal routing path between a first optimized child pin placed in a first child block among the plurality of child blocks and a second optimized child pin located in a second child block among the plurality of child blocks.

* * * * *